United States Patent Office 3,112,989
Patented Dec. 3, 1963

3,112,989
METHOD FOR PREPARING METAL COMPOUNDS
Mario D. Banus, Topsfield, Mass., assignor to Metal Hydrides Incorporated, Beverly, Mass., a corporation of Massachusetts
No Drawing. Filed Mar. 10, 1960, Ser. No. 13,985
10 Claims. (Cl. 23—14)

This invention relates to a method for preparing metal aluminum hydrides having the formula $M(AlH_4)_x$ where M is an alkali metal or alkaline earth metal and $x$ is the valence of the metal. More particularly, the invention relates to a method for preparing sodium aluminum hydride.

The patent to H. I. Schlesinger and A. E. Finholt No. 2,567,972, dated September 18, 1951, describes a method for preparing a metal aluminum hydride having the above formula. This method comprises reacting a hydride of an alkali metal or alkaline earth metal with an aluminum halide in an ether reaction medium. The reaction is illustrated by the equation:

$$4LiH + AlCl_3 \rightarrow LiAlH_4 + 3LiCl$$

Lithium aluminum hydride of high purity has been prepared in high yield commercially for several years by this method. However, the method has not been found satisfactory for the preparation of sodium aluminum hydride and other metal aluminum hydrides.

I have discovered a method whereby sodium aluminum hydride and other alkali metal and alkaline earth metal aluminum hydrides having the formula $M(AlH_4)_x$ can be synthesized directly from the elements. In accordance with the invention an alkali metal, such as sodium, lithium or potassium, or an alkaline earth metal, such as calcium or magnesium, or the hydride of an alkali or alkaline earth metal, is heated at an elevated temperature in a confined reaction zone with finely divided aluminum metal and a catalytic amount of a reaction promoter in an inert liquid carrier in the presence of hydrogen under superatmospheric pressure while agitating the mixture until reaction between the aluminum, hydrogen and the alkali metal or alkaline earth metal or hydride thereof is complete. Preferably, the aluminum metal and the alkali metal or alkaline earth metal or hydrides thereof are used in about equimolar proportions. I have found a temperature between about 100° C. and 200° C. and a hydrogen pressure between about 2500 and 5000 p.s.i. to be suitable. A higher pressure may be used but is not necessary.

Suitable reaction promoters for use in the practice of the invention are compounds having the formula

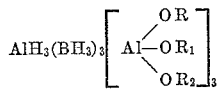

where R, $R_1$ and $R_2$ are monovalent radicals selected from alkyl, cycloalkyl, aralkyl, alkenyl and an alkyl radical substituted with a halogen. The amount of such reaction promoter used may vary from about 0.1 to 25 percent or more by weight based upon the weight of alkali metal or alkaline earth metal initially in the reaction mixture. The preparation of the above mentioned compounds is described in the patent to Janos Kollonitsch No. 2,903,470 and comprises reacting an ester of boric acid with aluminum hydride in an inert liquid carrier at a temperature below the temperature at which aluminum hydride decomposes.

Suitable inert liquid carriers are saturated liquid hydrocarbons, such as benzene, hexane, octane, ligroin and cyclohexane; the lower alkyl ethers, such as dimethyl ether, diethyl ether, diisopropyl ether and dibutyl ether; and ethers such as tetrahydrofuran, dioxane, dimethyl ether of ethylene glycol and the diethyl ether of diethylene glycol; and mixtures of ethers and liquid hydrocarbons. Preferably, the liquid carrier should contain a solvent for the reaction promoter in an amount sufficient to dissolve the same.

The invention is illustrated further by the following specific example.

8 grams of 30 mesh aluminum metal, 7.5 grams of sodium metal, 4 grams of a compound having the formula

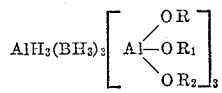

where R, $R_1$ and $R_2$ are isopropyl, and 125 ml. of hexane was charged into a 250 ml. Magne-Dash reactor fitted with a magnetic agitator and suitable heating means. Hydrogen was introduced into the reactor under a pressure of about 3500 p.s.i. The reaction mixture then was heated for 20 hours at a temperature of 150° C. with continuous agitation. After cooling the reaction mixture, the hexane was decanted and the residual solid extracted with tetrahydrofuran. The tetrahydrofuran was evaporated from the extract to obtain a solid. X-ray analysis showed that the solid contained a substantial amount of sodium aluminum hydride.

I claim:

1. The method for preparing a metal aluminum hydride having the formula $M(AlH_4)_x$ where M is a metal selected from the group consisting of alkali metals and alkaline earth metals and $x$ is the valence of the selected metal which comprises heating in a confined reaction zone a material selected from the group consisting of alkali metals, alkaline earth metals and hydrides of such metals with finely divided aluminum metal and a catalytic amount of a reaction promoter from about 0.1 to 2.5 percent by weight based upon the weight of said selected material used in an inert liquid carrier at a temperature above about 100° C. but below the decomposition temperature of any compound in the reaction mixture in the presence of hydrogen under superatmospheric pressure above about 2500 p.s.i. while agitating the mixture until reaction between said selected material, aluminum and hydrogen is complete, said reaction promoter being a compound having the formula

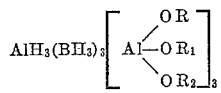

in which R, $R_1$, and $R_2$ are monovalent radicals selected from the group consisting of alkyl, cycloalkyl, aralkyl, alkenyl and an alkyl radical substituted with a halogen.

2. The method as claimed by claim 1 wherein said selected material is an alkali metal.

3. The method as claimed by claim 1 wherein said selected material is an alkali metal hydride.

4. The method as claimed by claim 2 wherein said elevated temperature is between 100° C. and 200° C. and said pressure is between 2500 and 5000 p.s.i.

5. The method as claimed by claim 3 wherein said elevated temperature is between 100° C. and 200° C. and said pressure is between 2500 and 5000 p.s.i.

6. The method as claimed by claim 4 wherein R, $R_1$ and $R_2$ are alkyl radicals.

7. The method as claimed by claim 5 wherein R, $R_1$ and $R_2$ are alkyl radicals.

8. The method as claimed by claim 6 wherein said selected material is sodium metal.

9. The method as claimed by claim 7 wherein said selected material is sodium.

10. The method as claimed by claim 9 wherein R, $R_1$ and $R_2$ are isopropyl radicals.

References Cited in the file of this patent
UNITED STATES PATENTS

| | | |
|---|---|---|
| 2,372,671 | Hansley | Apr. 3, 1945 |
| 2,729,540 | Fisher | Jan. 3, 1956 |
| 2,900,402 | Johnson | Aug. 18, 1959 |
| 2,903,471 | Kollonitsch | Sept. 8, 1959 |
| 2,903,472 | Kollonitsch | Sept. 8, 1959 |
| 2,920,935 | Finholt | Jan. 12, 1960 |
| 2,992,248 | Pearson | July 11, 1961 |
| 3,057,686 | Mutterties | Oct. 9, 1962 |